United States Patent Office.

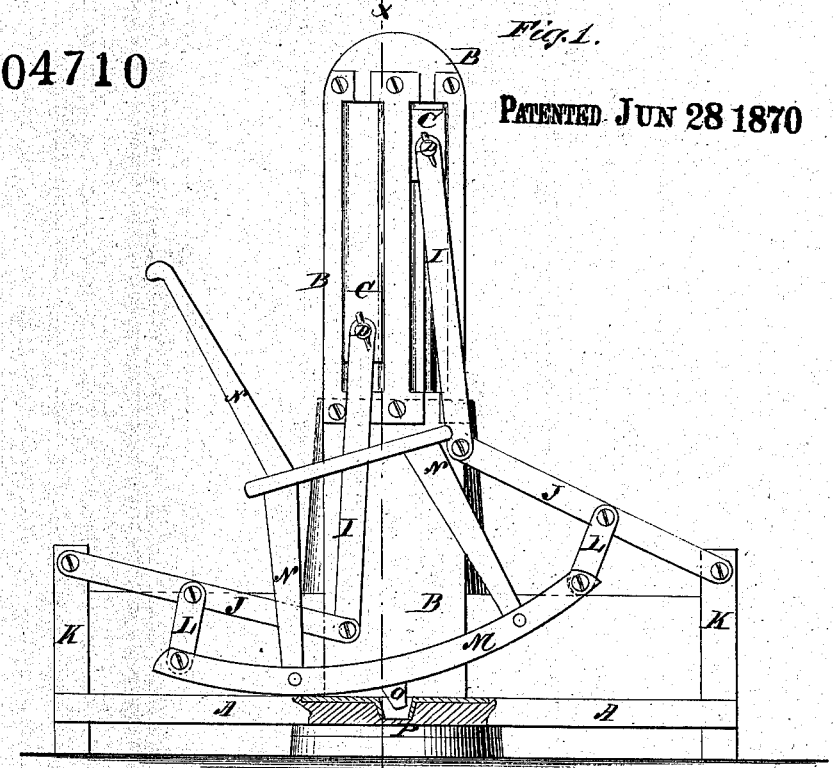
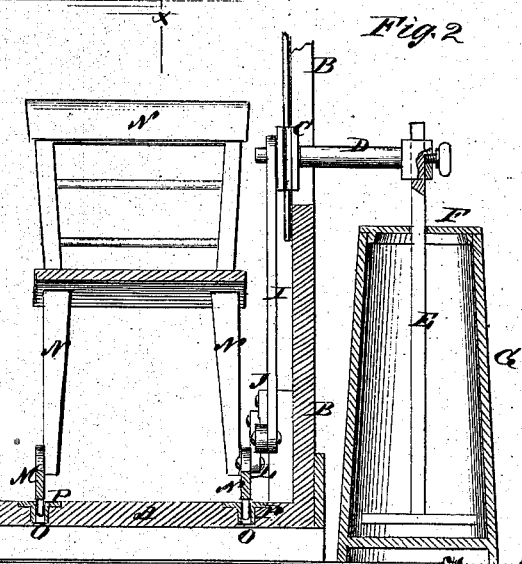

JAMES P. CURTIS, OF WYTHEVILLE, VIRGINIA.

Letters Patent No. 104,710, dated June 28, 1870.

IMPROVEMENT IN CHURNING APPARATUS.

The Schedule referred to in these Letters Patent and making part of the same.

*To all whom it may concern:*

Be it known that I, JAMES P. CURTIS, of Wytheville, in the county of Wythe and State of Virginia, have invented a new and useful Improvement in Churning Apparatus; and I do hereby declare that the following is a full, clear, and exact description thereof, which will enable others skilled in the art to make and use the same, reference being had to the accompanying drawing forming part of this specification.

Figure 1 is a side view of my improved churning apparatus, part being broken away to show the construction.

Figure 2 is a vertical detail section of the same, taken through the line $x\,x$, fig. 1.

Figure 3 is a top view of the churn, the cover being removed.

Similar letters of reference indicate corresponding parts.

My invention has for its object to furnish an improved churning apparatus which shall be so constructed and arranged that the operation of churning may be changed from a labor to a pleasure, enabling even a child to work the machine, and which shall, at the same time, bring the butter quickly and thoroughly; and It consists in the construction and combination of the various parts of the machine, as hereinafter more fully described.

A represents a platform of suitable size, to the middle part of one side of which is attached an upright frame or board, B, in the upper part of which are formed two slots to serve as ways for the blocks C to slide up and down in.

To the slides C are attached arms D having holes in their outer ends to receive the upper ends of the dasher-handles E, which are adjustably secured in place by set-screws, as shown in fig. 2.

The dasher-handles E pass down parallel with each other, through separate holes in the cover F of the churn G, and to the lower end of each of them is attached a semicircular dasher, H, which dashers H are arranged with their straight sides toward each other, so that they may pass each other freely when moving in opposite directions through the churn G.

The semicircular dashers H are perforated, as shown in fig. 3, so that, as they are forced through the milk or cream in the churn, the said milk or cream may be divided up into small streams or currents, which are broken up and intermingled by the passage of the said dashers in opposite directions at the same time, so as to bring the butter in a very short time.

To the inner sides of the sliding blocks C, or to the inner ends of the arms D, projecting from said blocks, are pivoted the upper ends of the connecting-rods or bars I, the lower ends of which are pivoted to the inner ends of the levers J, the outer ends of which are pivoted to supports K, attached to the side of platform A.

L are two short connecting-rods or bars, the upper ends of which are pivoted to the levers J, and the lower ends of which are pivoted to the opposite ends of one of the rockers M of the chair N, which sits upon the platform A, to which it is pivoted and kept from moving about by the projections or teeth O, attached to or formed upon the middle part of the said rockers M, and which enter recesses or sockets P, formed in the platform A for their reception, as shown in figs. 1 and 2.

The chair N may be an ordinary chair, or a chair made expressly for the machine, and the rockers M may be detachably or permanently attached to it, as may be desired.

Having thus described my invention,

I claim as new, and desire to secure by Letters Patent—

1. An improved churning apparatus formed by the combination of the chair N, rockers M, short connecting-bars or rods L, levers J, connecting-rods or bars I, sliding blocks C, arms D, dasher-handles E, and semicircular dashers H, with each other and with the platform A, upright board or frame B, cover F, and churn G, substantially as herein shown and described, and for the purpose set forth.

2. The combination of the projections or teeth O, and sockets or recesses P, with the rockers M of the chair N, by means of which the churn is operated, substantially as herein shown and described, and for the purpose set forth.

JAMES P. CURTIS.

Witnesses:
S. HOOPER,
ROBERT G. CORWIN.